(12) United States Patent
Yoshizawa (10) Patent No.: US 9,152,013 B2
(45) Date of Patent: Oct. 6, 2015

(54) LIGHT-QUANTITY CONTROL APPARATUS AND OPTICAL APPARATUS

(71) Applicant: CANON DENSHI KABUSHIKI KAISHA, Chichibu-shi (JP)

(72) Inventor: Takahito Yoshizawa, Kawaguchi (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 0 days.

(21) Appl. No.: 14/624,734

(22) Filed: Feb. 18, 2015

(65) Prior Publication Data

US 2015/0160533 A1    Jun. 11, 2015

Related U.S. Application Data

(63) Continuation of application No. PCT/JP2013/004977, filed on Aug. 23, 2013.

(30) Foreign Application Priority Data

Aug. 24, 2012  (JP) .................................. 2012-185747

(51) Int. Cl.
  *G03B 9/06*  (2006.01)
(52) U.S. Cl.
  CPC ......................... *G03B 9/06* (2013.01)
(58) Field of Classification Search
  CPC ..................................... G03B 9/06; G03B 9/02
  USPC ..................................... 396/510, 497; 359/234
  See application file for complete search history.

(56) References Cited

U.S. PATENT DOCUMENTS

| 4,319,821 | A  | * | 3/1982 | Tezuka et al. ................. 396/449 |
| 7,907,321 | B2 | * | 3/2011 | Mizumaki et al. ............ 359/234 |
| 2008/0192326 | A1 |   | 8/2008 | Mizumaki et al. |
| 2011/0128604 | A1 |   | 6/2011 | Mizumaki et al. |
| 2011/0164297 | A1 | * | 7/2011 | Abe et al. ...................... 359/227 |
| 2012/0194796 | A1 | * | 8/2012 | Nakajima et al. ............. 355/71 |
| 2013/0170009 | A1 | * | 7/2013 | Yoshizawa et al. ........... 359/230 |

FOREIGN PATENT DOCUMENTS

| JP | 01-130140 A  |   | 5/1989 |           |
| JP | 2-48928 U    |   | 4/1990 |           |
| JP | 2006072151 A | * | 3/2006 | ............... G03B 9/02 |
| JP | 2008-197177 A |  | 8/2008 |           |

OTHER PUBLICATIONS

Feb. 24, 2015 International Preliminary Report on Patentability in International Patent Appln. No. PCT/JP2013/004977.
Nov. 19, 2013 International Search Report in International Patent Appln. No. PCT/JP2013/004977.

* cited by examiner

*Primary Examiner* — Christopher Mahoney
(74) *Attorney, Agent, or Firm* — Fitzpatrick, Cella, Harper & Scinto (57) ABSTRACT

A light-quantity control apparatus includes multiple light-quantity control blades each configured to overlap with at least another one of the light-quantity control blades so as to form a light-passing aperture and each configured to rotate to change a size of the light-passing aperture. Each of the multiple light-quantity control blades includes a thick portion and a thin portion. The thick portion forms an outer end portion on an opposite side to the light-passing aperture in a rotation direction of the light-quantity control blade. The thin portion is formed in an aperture side blade area that overlaps with the at least another one of the multiple light-quantity control blades so as to form part of a circular overlap of the multiple light-quantity control blades and that includes an inner edge forming an edge of the light-passing aperture.

13 Claims, 5 Drawing Sheets

LIGHT-QUANTITY CONTROL APPARATUS AND OPTICAL APPARATUS

CROSS-REFERENCE TO RELATED APPLICATIONS

This application is a continuation of International Patent Application No. PCT/JP2013/004977, filed on Aug. 23, 2013 which is hereby incorporated by reference herein in its entirety as if fully set forth herein.

BACKGROUND OF THE INVENTION

1. Field of the Invention

The present invention relates to a light-quantity control apparatus installed in optical apparatuses such as image capturing apparatuses and interchangeable lenses.

2. Description of the Related Art

It is desirable that a shape of a stop aperture as a light-passing aperture formed in such a light-quantity control apparatus (aperture stop apparatus) be a circle as closely as possible. For this reason, three or more multiple stop blades (light-quantity control blade) are often used in the light-quantity control apparatus in order to form a stop aperture whose shape is close to the circle.

Japanese Utility Model Laid-Open No. H2-48928 discloses an iris aperture stop apparatus that causes a driving ring rotatable around a fixed aperture formed in a base member to rotate multiple stop blades to form a stop aperture whose shape is a polygon close to the circle.

However, in the iris aperture stop apparatus disclosed in Japanese Utility Model Laid-Open No. H2-48928, a load generated by overlapping of the stop blades may be excessively large.

SUMMARY OF THE INVENTION

The present invention provides a light-quantity control apparatus in which a load generated by overlapping of light-quantity control blades can be reduced. The present invention further provides an optical apparatus including the light-quantity control apparatus.

Further features and aspects of the present invention will become apparent from the following description of exemplary embodiments with reference to the attached drawings.

DESCRIPTION OF EMBODIMENT

An exemplary embodiment of the present invention will be described below with reference to the accompanied drawings.

In a light-quantity control apparatus as an embodiment of the present invention, multiple light-quantity control blades each overlap with at least one of the other light-quantity control blades so as to form a light-passing aperture and are each rotated to change a size of the light-passing aperture. The light-quantity control blades are characterized in that they each have, at an aperture-side portion that is a portion where one of them overlaps with at least one of the other blades such that they, as a whole, overlap one another in a ring-like manner and that includes an inner edge forming an edge of the light-passing aperture, a thin portion formed such that a thickness of the thin portion decreases toward the inner edge in their rotation direction. This structure in which each light-quantity control blade has the thin portion formed such that the thickness of the thin portion decreases toward the inner edge results in a decrease in a reaction force generated at each portion where the blade overlaps with at least one of the others. In addition, the decrease in reaction force makes it easier to close down a stop aperture diameter to a smaller one.

The "thin portion" as used herein refers to an edge of each portion where the multiple light-quantity control blades are arranged such that they each overlap with at least one of the others in the ring-like manner, that is, part of each aperture-side portion including the inner edge forming part of the light-passing aperture where the thickness decreases toward the inner edge. Each thin portion can be formed in a desired shape in order to reduce a load generated by the overlapping of the blades (i.e., a resistance generated by physical interference such as friction). For instance, a section shape of each blade to the thin portion may be a sharply angled beak shape whose thickness becomes smaller toward an edge located on a light-passing-aperture side or may be a triangle shape whose thickness continuously decreases at the thin portion toward the edge located on the light-passing aperture. Since anyway it is only necessary that the load generated by the overlapping of the blades can be reduced by each thin portion, each thin portion may be formed such that at least part of a surface thereof has a convex or concave shape in the optical axis direction.

Since the multiple light-quantity control blades are to be rotated to form the light-passing aperture, it is at least undesirable to provide, on their surface where they each contact at least one of the other blades, a level difference that limits their operation in a rotation direction. For this reason, it is desirable that the surface of each portion where one of the multiple light-quantity control blades contacts with at least one of the other blades be a relatively smooth shape.

On the other hand, the multiple light-quantity control blades can be effectively reduced in weight because of their thin portion, which enables both of high-speed and smooth operations.

For these reasons, each thin portion can effectively function only in a very limited extent if they are provided by merely chamfering corners of the edge located on the light-passing-aperture side. It is therefore desirable to provide the thin portions in a relatively broad area so as to constitute the blade surface over the entire portion, in an area within which each light-quantity control blade is movable, where each blade overlaps with at least one of the others.

In addition, it is enough to form each thin portion only on a center portion of the inner edge located on the light-passing aperture side of the light-quantity control blade, namely, on a portion forming the light-passing aperture. In other words, it is not necessarily required to provide each thin portion on tip- and base-end sides of the blade that do not form the light-passing aperture. However, in order to effectively reduce the interference generated among the blades, it is desirable to provide a certain thin portion over the entire inner edge on the light-passing aperture side. It is desirable to reduce a thickness of each light-quantity control blade such that each blade has a lighter weight, but an excessive reduction in thickness makes it difficult to form a stable light-passing aperture. This means that the light-quantity control blades each have to have a certain thickness, but an excessive increase in thickness makes them undesirably difficult to smoothly operate and results in an increase in the interference generated among them. In the embodiment, in light of the above-described issues, each thin portion constituting part of the surface of the blade is provided, at the portion where the blade interferes with at least one of the others, to reduce the interference, and each thick portion other than each thin portion is formed to ensure a required stiffness of the blade. This enables smoothly operating each blade and stably forming the light-passing aperture. In the embodiment, each thin portion is formed up to the inner edge of the light-quantity control blade located at the light-passing-aperture side, which enables preventing diffuse reflection at the inner edge of the blade. Moreover, each light-quantity control blade used in the embodiment can be described alternatively as follows. That is, the apertureside portion of each light-quantity control blade that is the portion where the blade overlaps with at least one of the others and that includes the inner edge forming the edge of the light-passing aperture is formed such that the thickness of the aperture-side portion continuously decreases toward the inner edge in the rotation direction of each blade in order to reduce the reaction force (warp or deformation) caused by the overlapping. This enables suppressing the warp caused by the multiple blades, which allows the blades to be housed within a barrel of a base member of the light-quantity control apparatus constituted by a cam member, a rotating member, a retainer and the like. Forming each light-quantity control blade such that each blade does not warp the outside of the barrel of the light-quantity control apparatus allows the light-quantity control apparatus to be disposed closer to a lens and the like of an image capturing apparatus. This makes it possible to downsize an optical apparatus including the light-quantity control apparatus.

Figure 1:
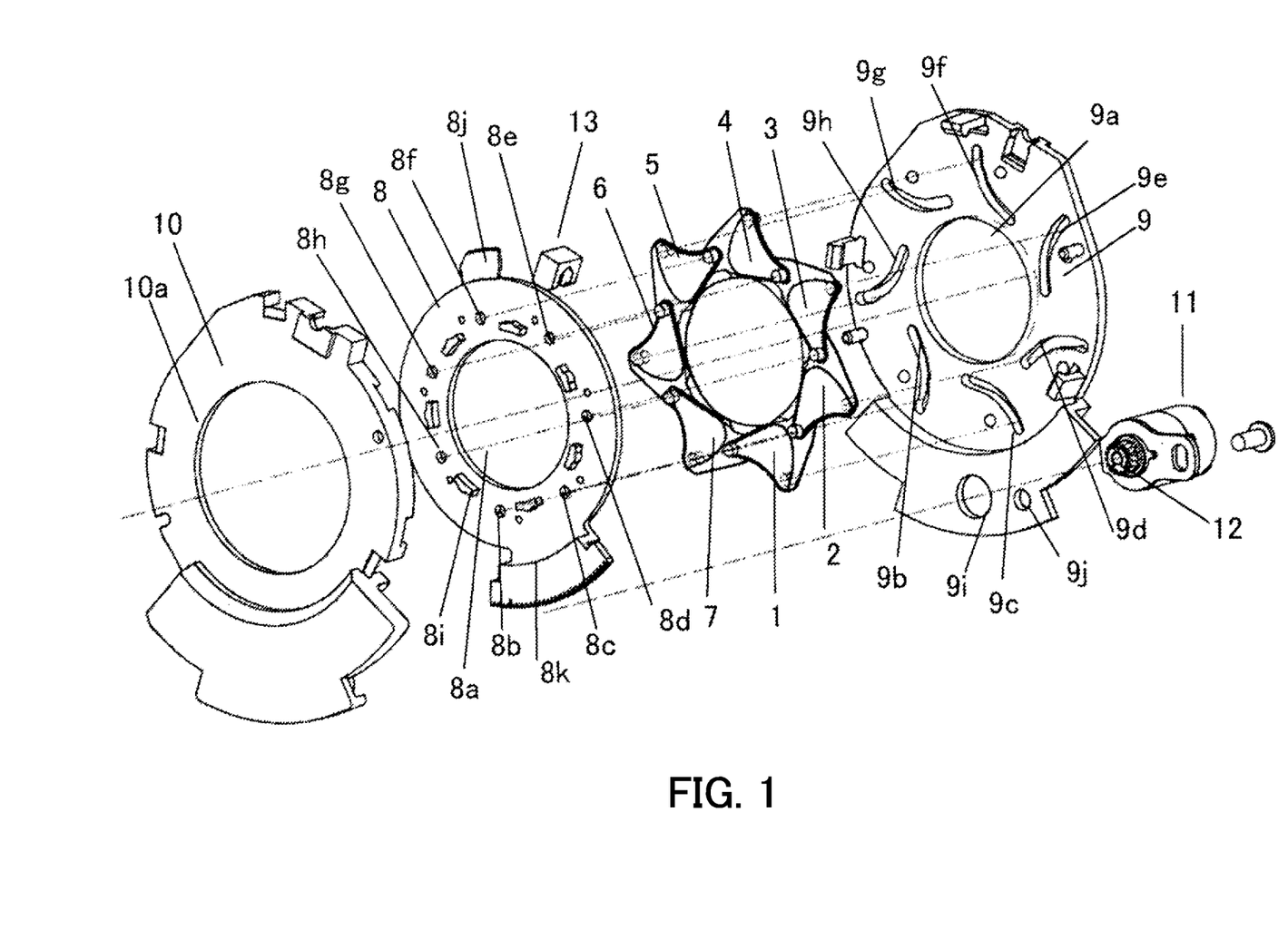
FIG. 1 is an exploded perspective view of an aperture stop apparatus that is an embodiment of the present invention.
Figure 2:
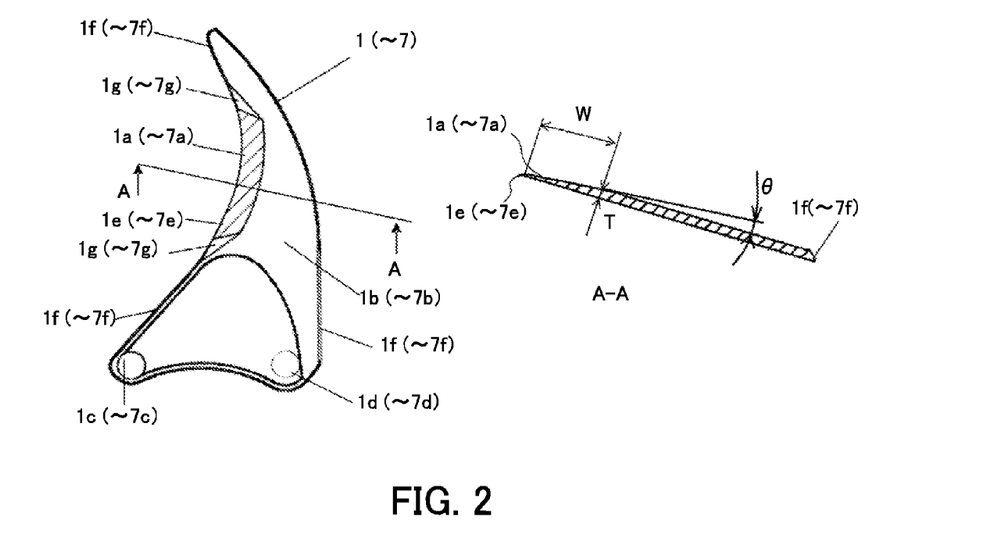
FIG. 2 is plan and sectional views of each stop blade used in the aperture stop apparatus of the embodiment.

FIG. 1 illustrates an iris aperture stop apparatus as the light-quantity control apparatus that is the embodiment of the present invention, which is exploded. FIG. 2 illustrates a shape of one of multiple stop blades as the light-quantity control blades used in the aperture stop apparatus, which is viewed from a front side, and a section of each blade formed by an A-A line.

In FIG. 1, reference numerals 1, 2, 3, 4, 5, 6 and 7 denote stop blades. Although this embodiment will describe a case where seven stop blades are used, the present invention is applicable to aperture stop apparatuses using three or more multiple stop blades (light-quantity control blade). In the following description, the stop blades 1, 2, 3, 4, 5, 6 and 7 will be abbreviated as the stop blades 1 to 7, and each portion of each stop blade 1 to 7 will be denoted by 1x to 7x.

The stop blades 1 to 7 are molded-in component parts made of plastic (synthetic resin) and formed in a thin-plate shape. As illustrated in FIG. 2, the stop blades 1 to 7 have base portions having, on their one surface, first boss portions 1c to 7c serving as rotation center axes and, on the other surface opposite thereto, second boss portions 1d to 7d serving as driven shafts to which a driving force required for rotation is input, and also have blade portions 1b to 7b formed so as to become thinner from the base portions toward the tips. On the blade portions 1b to 7b, slope portions (thin portion) 1a to 7a, which will be described later in detail, are formed. The slope portions 1a to 7a whose thickness decreases toward the inner edges forming a stop aperture overlap one another in the ring-like manner, which enables reducing the reaction force generated among the blades, compared to those of conventional blades. The reduction in the reaction force enables smoothly operating the blades and reducing an amount of the warp caused by the reaction force.

In FIG. 1, reference numeral 8 denotes a rotating member formed in a ring shape that has an opening aperture 8a formed thereon. In the following description, a direction orthogonal to an opening plane of the opening aperture 8a and to those of opening apertures (9a and 10a) formed on members described later is referred to as "an optical axis direction". The rotating member 8 has axis hole portions 8b to 8h formed at seven locations in its circumferential direction, seven ridge portions (elongated protrusion) 8i located in its circumferential direction and a gear portion 8j formed at a location in its circumferential direction. In addition, the rotating member 8 has a light-shielding portion 8k formed thereon at a location in its circumferential direction.

Reference numeral 9 denotes a cam member formed in a ring shape and serving also as the base member of the aperture stop apparatus of this embodiment. The cam member 9 has an opening aperture 9a formed on a center thereof, cam groove portions 9b to 9h formed thereon at seven locations in its circumferential direction, and a hole portion 9i and a motor support 9j each provided thereon at a location in its circumferential direction.

Reference numeral 10 denotes a retainer formed in a ring shape and having an opening aperture 10a formed on a center thereof.

Reference numeral 11 denotes a stepping motor that drives the rotating member 8. To an output shaft of the stepping motor 11, a pinion gear 12 is fixed so as to rotate together with the output shaft in an integrated manner. The stepping motor 11 is fixed to the motor support 9j of the cam member 9. The pinion gear 12 penetrates the hole portion 9i of the cam member 9 and is engaged with the gear portion 8j of the rotating member 8. The stepping motor 11 may be fixed alternatively to the retainer 10. The rotating member 8, the cam member 9, the stepping motor 11 and the pinion gear 12 constitute a driving mechanism of the aperture stop apparatus of this embodiment.

Reference numeral 13 denotes a position sensor constituted by a photo interrupter. The light-shielding portion 8k formed on the rotating member 8 is inserted between a light-projecting portion and a light-receiving portion of the position sensor 13, which enables the position sensor 13 to detect that the rotating member 8 is located at an initial position of the rotating member 8. The "initial position" as used herein refers to a position where a diameter (size) of the stop aperture formed by the stop blades 1 to 7 is a predetermined fully-opened-aperture diameter. Counting, with reference to the initial position detected by the position sensor 13, the number of drive pulse signals sent to the stepping motor 11 enables controlling the diameter of the stop aperture to control light quantity.

The retainer 10 is fixed to the cam member 9 across a space formed therebetween in which the stop blades 1 to 7 and the rotating member 8 are arranged in this order to prevent the rotating member 8 and the stop blades 1 to 7 from falling off from the cam member 9. The ridge portion 8*i* formed on the rotating member 8 is rotatably inserted into the opening aperture 10*a* of the retainer 10. An outer circumferential face of the ridge portion 8*i* is slid with respect to an inner circumferential face of the opening aperture 10*a* of the retainer 10, which makes the rotating member 8 supported rotatably in the circumferential direction (optical-axis-rotation direction).

The first boss portions 1*c* to 7*c* of the stop blades 1 to 7 are rotatably inserted into the axis hole portions 8*b* to 8*h* formed in the rotating member 8. On the other hand, the second boss portions 1*d* to 7*d* are inserted into the cam groove portions 9*b* to 9*h* formed on the cam member 9.

When the stepping motor 11 fixed to the cam member 9 is driven, the pinion gear 12 is rotated, which causes the rotating member 8 whose gear portion 8*j* is engaged with the pinion gear 12 to be rotated accordingly. This causes the second boss portions 1*d* to 7*d* of the stop blades 1 to 7 to be moved along the cam groove portions 9*b* to 9*h* of the cam member 9 (that is, the driving force is transmitted by the cam groove portions 9*b* to 9*h* to the second boss portions 1*d* to 7*d*), which causes the stop blades 1 to 7 to be rotated about the first boss portions 1*c* to 7*c*.

The stop blades 1 to 7 are evenly spaced in the circumferential direction. The blade portions 1*b* to 7*b* each overlap with the blade portion of at least one of the other blades, forming, inside the blade portions 1*b* to 7*b*, the stop aperture, which is the light-passing aperture. The rotation of the stop blades 1 to 7 changes an amount of the overlapping of the blade portions 1*b* to 7*b*, which continuously changes the diameter of the stop aperture. The larger the amount of the overlapping of the stop blades 1 to 7 (blade portions 1*b* to 7*b*), the smaller the diameter of the stop aperture becomes. In the following description, a direction in which each stop blade is rotated is referred to as "a blade rotation direction".

Figure 6:
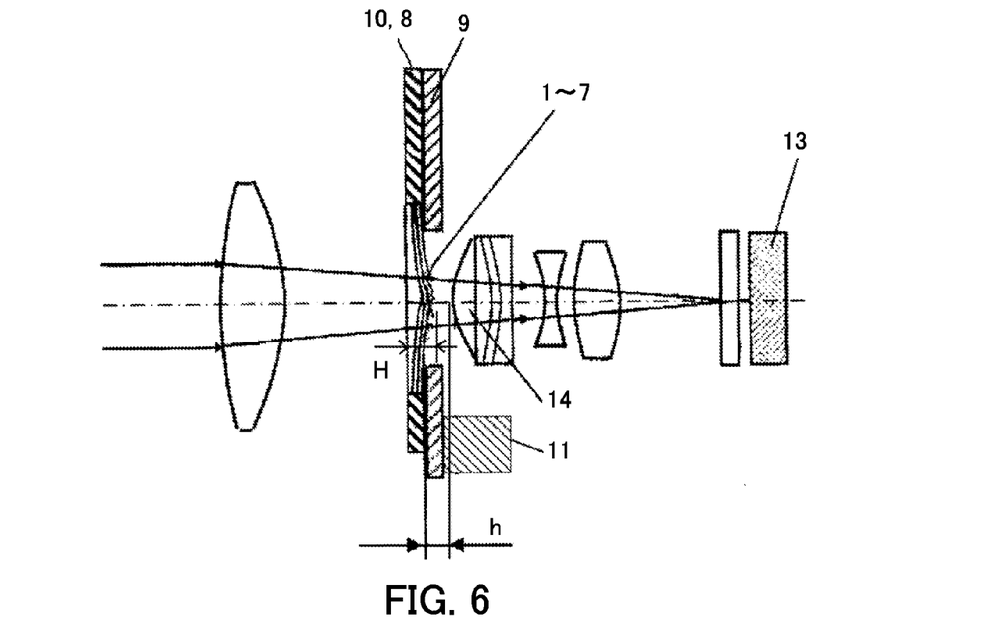
FIG. 6 is a sectional view of an image capturing apparatus including the aperture stop apparatus of the embodiment.

FIG. 6 illustrates a configuration of an image capturing apparatus including, in its body, the aperture stop apparatus configured as described above. Reference numeral 14 denotes a lens disposed adjacently to the aperture stop apparatus on an image side of the aperture stop apparatus. Reference numeral 13 denotes an image sensor that photoelectrically converts an object image formed by an image capturing optical system including the lens and the aperture stop apparatus.

Figure 8:
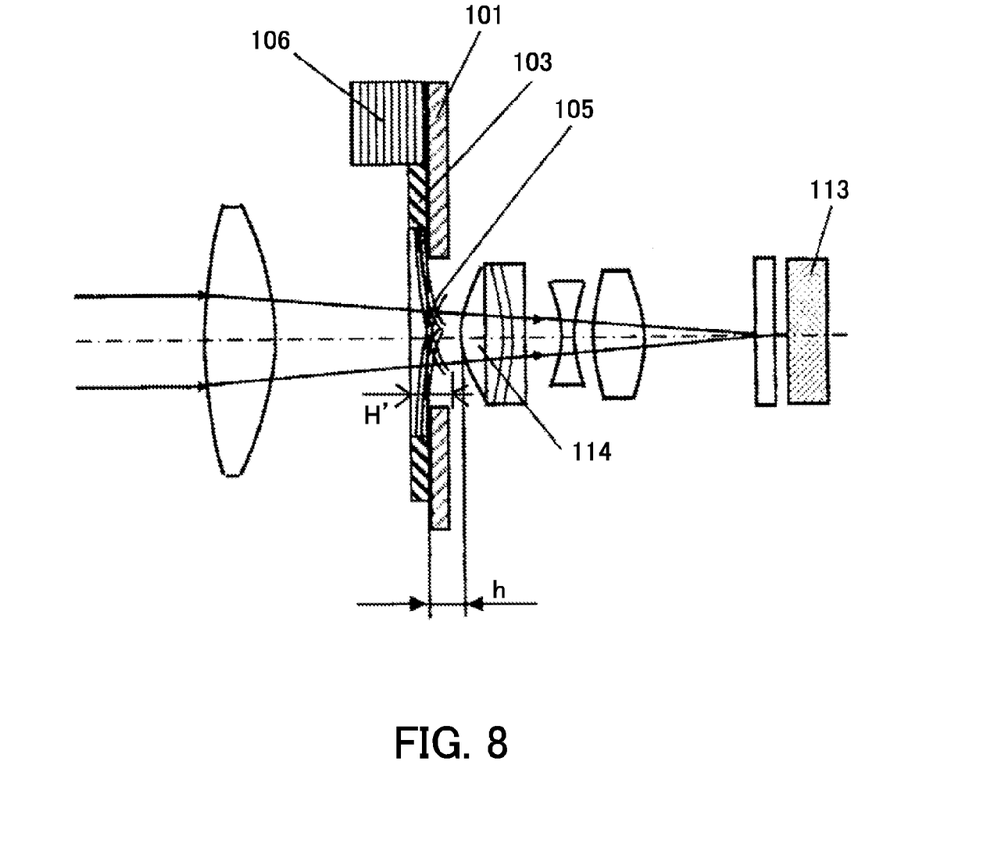
FIG. 8 is a sectional view of an image capturing apparatus including the conventional aperture stop apparatus.

Description will now be made of problems that of a conventional iris aperture stop apparatus and an image capturing apparatus including the same. FIG. 8 illustrates a configuration of the image capturing apparatus including the conventional iris aperture stop apparatus. Reference numeral 101 denotes a base member of the aperture stop apparatus, and 103 a driving ring rotatable around a fixed aperture of the base member 101. Reference numeral 106 denotes an actuator that rotates the driving ring 103, and 105 multiple stop blades to be rotated by the driving ring 103 about an axis portion (not illustrated) provided to the base member 101. Furthermore, reference numeral 114 denotes a lens disposed adjacently to the aperture stop apparatus, and 113 an image sensor that photoelectrically converts an object image formed by an image capturing optical system including the lens 114 and the aperture stop apparatus.

Figure 7:
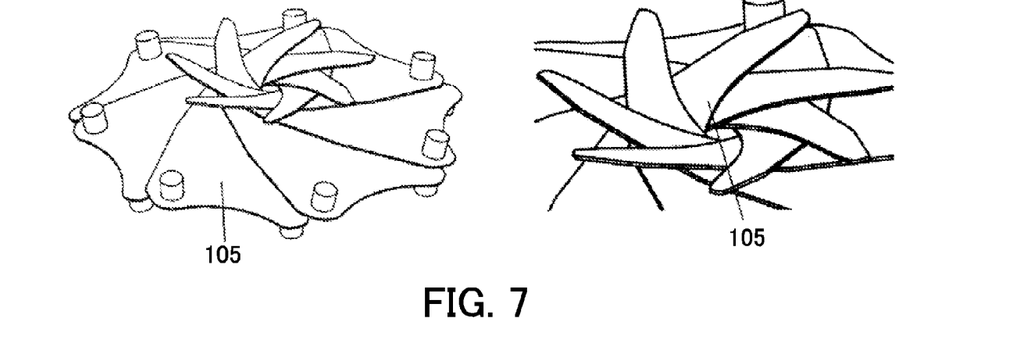
FIG. 7 is a perspective view illustrating the warp of each stop blade of a conventional aperture stop apparatus that is in the small aperture state.

FIG. 8 illustrates the multiple stop blades 105 folded so as to form a small stop aperture (small aperture state). FIG. 7 illustrates an enlarged view of the multiple stop blades 105 that are in the small aperture state. Gradually closing down the stop aperture causes tips of the multiple stop blades 105 to overlap one another, which causes the stop blades 105 to warp with respect to the lens 114. For this reason, in order to prevent the stop blades 105 and the lens 114 from interfering with each other, it is necessary to ensure, in advance, a retraction space h' that allows the lens 114 to retract from the aperture stop apparatus. This, however, results in an increase in size of the image capturing apparatus.

Moreover, the blades may be scratched due to a load generated by their overlapping, which may degrade an optical performance as a result of reflection of light at the scratched portions.

Furthermore, since each stop blade has a certain thickness, the thickness creates a large level difference with respect to an aperture plane of the stop aperture. This results in so-called small aperture diffraction that tends to degrade the optical performance.

In contrast to the conventional one, in the light-quantity control apparatus of the embodiment, it is possible to reduce the reaction force generated by the overlapping of the multiple stop blades folded (and the warp of the blades caused due to the reaction force). It is further possible to decrease the load generated by the overlapping of the blades and suppress the small aperture diffraction.

As described above, forming the aperture-side portion of each stop blade such that the thickness of the aperture-side portion continuously decreases toward the inner edge reduces the warp caused by the overlapping of the multiple stop blades folded, which makes it possible to downside the light-quantity control apparatus in a thickness direction. This enables improving an optical performance of the optical apparatus including the light-quantity control apparatus of the embodiment. Moreover, each aperture-side portion is formed as described above, which enables reducing the load generated by the overlapping of the blades to prevent the blades from being scratched and decreasing the level difference between the blades and the light-passing aperture to suppress the optical performance.

As described with reference to FIGS. 7 and 8, when the conventional aperture stop apparatus is in the small aperture state in which the multiple stop blades 105 are folded to form the small stop aperture, the multiple stop blades 105 largely warp in the optical axis direction (lens-114 side) due to their overlapping.

Figure 3:
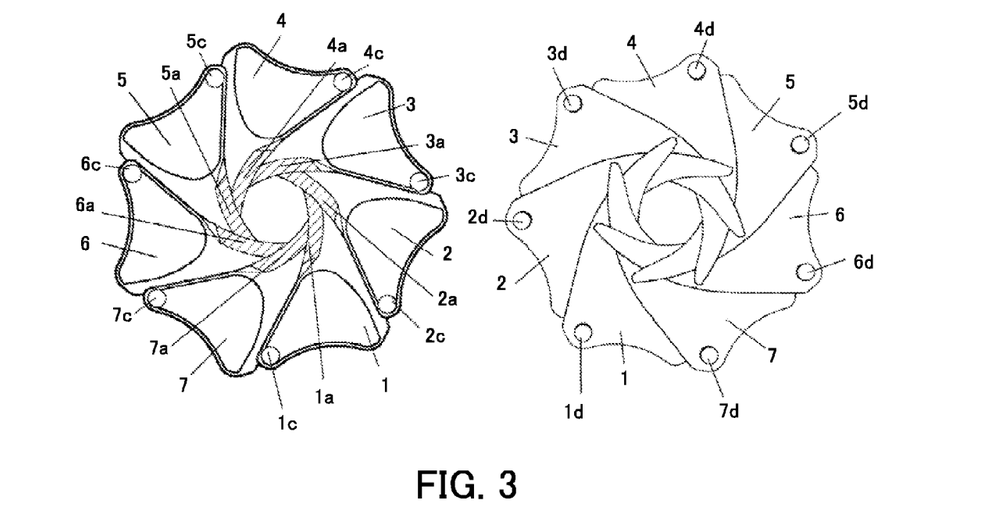
FIG. 3 illustrates the stop blades of the aperture stop apparatus of the embodiment that is in a middle aperture state, which is viewed from an optical axis direction.
Figure 4:
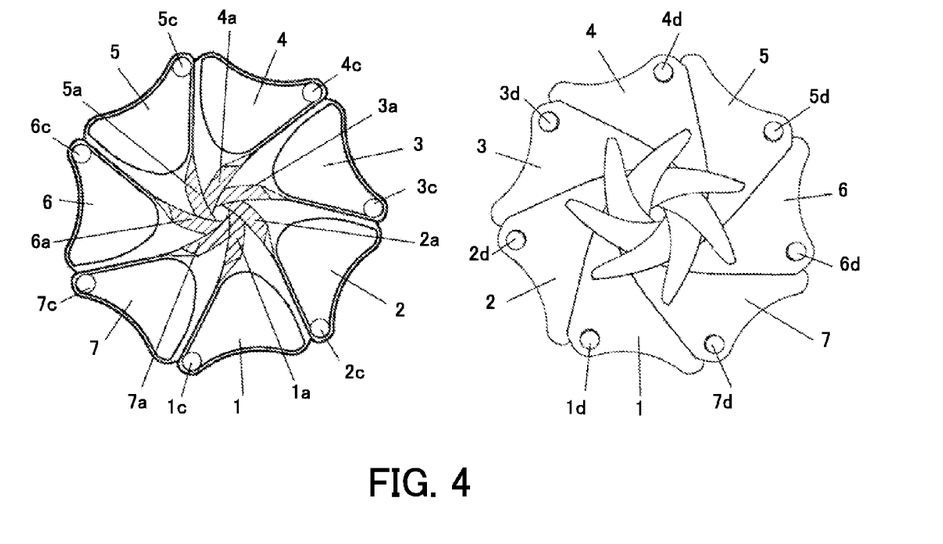
FIG. 4 illustrates the stop blades of the aperture stop apparatus of the embodiment that is in a small aperture state, which is viewed from the optical axis direction.

In order to solve a problem that the blades warp in the small aperture state, in this embodiment, the blade portions (1*b* to 7*b*) of the stop blades (1 to 7) are formed as described below. As illustrated in FIGS. 2 and 3, the portion of the blade portion of each stop blade that overlaps with the blade portion of at least one of the other stop blades (the portion where the multiple stop blades overlap with at least one of the other blades in the ring-like manner) and includes the inner edge (1*e* to 7*e*) forming the edge of the stop aperture is referred to as the aperture-side portion (1*a* to 7*a*). In this embodiment, in order to reduce the reaction force (warp) caused by the overlapping, the aperture-side portions (1*a* to 7*a*) are formed as the slope portions (thin portion) whose thickness continuously decreases toward the inner edges (1*e* to 7*e*) in the blade rotation direction. In FIG. 2, the blade rotation direction is shown as a direction along the A-A line. FIG. 3 illustrates the stop blades 1 to 7 forming a stop aperture whose diameter is larger than that of the small stop aperture, which are viewed from a rotating-member-8 side (left part of the drawing) and a cam-member-9 side (right part of the drawing). FIG. 4 illustrates the stop blades 1 to 7 forming the small stop aperture, which are viewed from the-rotating-member-8 side (left side of the drawing) and the cam-member-9 side (right part of the drawing).

FIG. 2 illustrates, as an example of a shape of each aperture-side portion in which "the thickness continuously decreases toward the inner edge", a case where one of faces of each aperture-side portion (1a to 7a) in the thickness direction that is on the-rotating-member-8 side (first face) is a slope face sloped to the other of the faces that is on the cam-member-9 side (second face) at a constant slope angle θ. This example is also an example of a shape of each slope portion in which the thickness decreases toward the inner edge continuously and at a constant rate. Applicable shapes of each slope portion in which the thickness continuously decreases toward the inner edge are, however, not limited to this, and they may each be a slope face in which both of the first and second faces are sloped, decreasingly at any rate, to parallel-flat-shaped parts of each blade portion (1b to 7b) other than the aperture-side portion (1a to 7a). In this case, it is desirable that an angle (slope angle) θ formed by the first and second faces be between 1 to 30 degrees such that a shape formed is beak-like. Incidentally, since the smaller the angle θ, the smaller the warp of each blade becomes, it is more desirable that the angle θ be equal to or less than 20 or 10 degrees such that the shape formed is a gradually tapered shape. Forming the first and second faces such that they have the angle θ equal to or less than 30 degrees enables continuously and gradually changing the warp caused by the overlapping of the multiple stop blades folded. This enables preventing the stop blades from being scratched and deformed due to their sharp warp. In addition, a smaller angle θ results in a reduction in load variation due to the overlapping, which enables preventing an operation error of the aperture stop apparatus.

When at least one of the first and second faces is formed not in a flat shape such as that of each sloped face, but in a curved-face shape, the thickness of each aperture-side portion is not required to continuously decrease toward the inner edge at a constant rate. In this case, it is desirable that an angle formed by tangent lines formed by the first and second faces (i.e., angle corresponding to the above-described slope angle) be between 1 to 30 degrees, and more desirably, less than 20 or 10 degrees.

It is further desirable that a width W of each aperture-side portion (1a to 7a) in the blade rotation direction be equal to or more than three times of and equal to or less than thirty times of a maximum thickness T of the aperture-side portion. Because of the width W, forming a portion that is, even when the stop aperture diameter changes, thinner than the blade portion, which is thick, over the entire area from the inner edge of the stop aperture to the portion, located before a portion where the blades each warp with at least one of the others and consequently leave, where the blades each overlap with at least one of the others, enables reducing the reaction force generated among the blades. The smaller the angle θ, the larger integral multiple of the maximum thickness T the width W is. Although this embodiment (FIG. 2) describes a case where each aperture-side portion (1a to 7a) is formed at part of the blade portion (1b to 7b) in the blade rotation direction, each aperture-side portion may be formed over of the entire blade portion (1b to 7b) in the blade rotation direction.

In addition, the aperture-side portion (1a to 7a) of each stop blade (1 to 7) may have, at the inner edge (1e to 7e), a portion with a constant thickness. The expression "the thickness continuously decreases toward the inner edge" does not necessarily require that the thickness of each aperture-side portion continuously decreases so as not to include a portion with a constant thickness up to the inner edge.

A result of a comparison made between a case where the thickness of each aperture-side portion continuously decreases toward the inner edge in a manner such as that in this embodiment and a case where each blade portion is formed merely so as to have a same thickness as that of the inner edge thinly formed (that is, an entire part of each stop blade is thin) assuming that the inner edges in the above cases have thicknesses same as each other shows that each stop blade of this embodiment has a higher strength than that in the latter case. In order also to ensure a strength required for each stop blade, forming each aperture-side portion such that the thickness thereof continuously decreases toward the inner edge can realize stop blades having a high blade strength despite a small thickness at their inner edge.

As illustrate in FIG. 2, a chamfer portion (1f to 7f) is formed at a circumferential edge of each stop blade (1 to 7) of this embodiment, and each aperture-side portion (1a to 7a) is formed independently of the chamfer portion, in other words, so as to have the width W larger than that of the chamfer portion. Each chamfer portion functions only to make the aperture-side portion not to have a corner and, unlike each aperture-side portion (1a to 7a), not to reduce the warp caused by the overlapping of the stop blades at all. Each chamfer portions (1f to 7f) makes the aperture-side portion not to have the corner, preventing the diffuse reflection of light in an optical path. For this reason, it is desirable to provide each thin portion (1a to 7a) or each chamfer portion (1f to 7f) at a portion serving as the optical path passing through the aperture of the base member and reaching the image sensor. Therefore, it is desirable to form each chamfer portion (1f to 7f) at, of a portion inserted more inside the aperture than a portion at which the size of the light-passing aperture is the largest, a portion where the slope portion (thin portion) (1a to 7a) is not provided whose thickness continuously decreases up to the inner edge (1e to 7e).

It is desirable to provide each chamfer portion at an edge of the thick portion to enable preventing the diffuse reflection of an entering light or of a reflected light from the image sensor and, as illustrated in FIG. 2, to form the portion of each stop blade that is rotated to be inserted into the opening aperture of the base member in a shape that prevents the diffuse reflection. Therefore, in the embodiment, forming each chamfer portion of the thick portion adjacently to the thin portion of the stop blade enables preventing the diffuse reflection, which enables an improvement in strength of each stop blade. In addition, at the circumferential edge of each stop blade (1 to 7), a sloped portion (1g to 7g) is provided such that the thickness of each blade continuously or gradually decreases from a tip side of the blade to the aperture-side portion (1a to 7a) and from the first boss portion (1c to 7c) to the aperture-side portion (1a to 7a). Each sloped portion (1g to 7g) makes it easier to ensure a required strength of the blade even when the aperture-side portion (1a to 7a) has a reduced thickness. In addition, each stop blade (1 to 7) of this embodiment is, in molding using a plastic material, doped with KET JENBLACK EC300J (made by Lion Corporation) as a light-shielding material. KET JENBLACK EC300J is a carbon black having a hollow-shell-shaped structure and has an excellent conductivity and, when mixed with a plastic having a same weight as that of the carbon black, a light-shielding effect more excellent than that of a carbon black whose particles are filled. This makes each stop blade of this embodiment having the thin portion less prone to cause ray leakage. Moreover, the excellent conductivity of KET JENBLACK EC300J prevents each stop blade (1 to 7) from being electrically charged and makes them dust-proof even when they are tilted and thus have an increased surface area.

Figure 5:
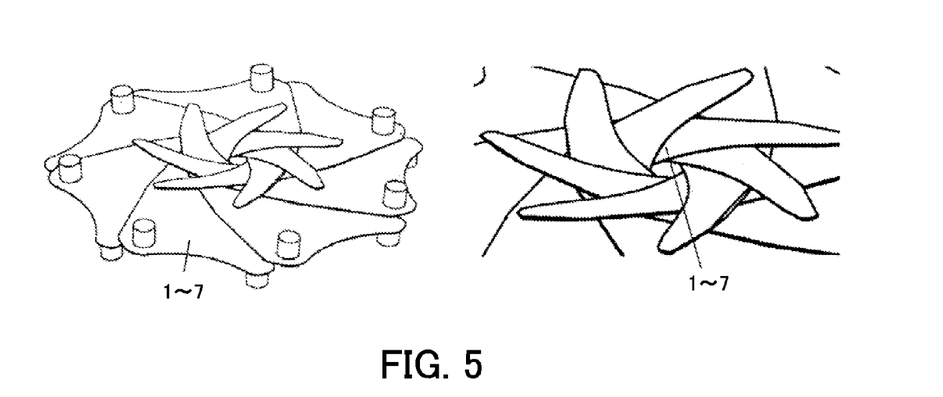
FIG. 5 is a perspective view illustrating a warp of each stop blade of the aperture stop apparatus of the embodiment that is in the small aperture state.

As described above, according to this embodiment, forming, at the blade portion (1b to 7b) of each stop blade (1 to 7), the aperture-side portion (1a to 7a) whose thickness continuously decreases toward the inner edge (1e to 7e) in the blade rotation direction enables reducing the blade warp as illustrated in FIGS. 5 and 6. FIG. 5 illustrates an enlarged view of the stop blades 1 to 7 that are in the small aperture state. In FIG. 6, symbol H represents a blade warp amount in the small aperture state in this embodiment that is smaller than a blade warp amount H' of the conventional aperture stop apparatus illustrated in FIG. 8. The decrease in blade warp amount enables forming the retraction space h that allows the lens and other optical members adjacent to the aperture stop apparatus to retract from the aperture stop apparatus such that the retraction space h has a smaller size compared to a conventional retraction space h', which enables downsizing the image capturing apparatus accordingly.

Furthermore, in this embodiment, forming the aperture-side portions ($1a$ to $7a$) enables reducing the load generated when each stop blade (1 to 7) is rotated while overlapping with at least one of the other blades. Specifically, as illustrated in FIGS. 3 and 4, the face (second face) of the aperture-side portion of each stop blade ($1a$ to $7a$) is rotated on the slope face (first face) of the aperture-side portion ($1a$ to $7a$) of at least one of the other stop blades while being slid thereon, which increases the diameter of the stop aperture. In this situation, the structure in which each aperture-side portion ($1a$ to $7a$) is thinly formed such that the thickness thereof continuously decreases toward the inner edge ($1e$ to $7e$) results in a sufficient sliding performance, which enables suppressing the load generation. This enables achieving a sufficient operation performance of the aperture stop apparatus and preventing each stop blade from being scratched.

The aperture stop apparatus of this embodiment, which is regarded to have an extremely small stop aperture diameter of 1 mm or less as a minimum stop aperture diameter in the small aperture state, is characterized differently from the conventional one in that the aperture stop apparatus can achieve such an extremely small stop aperture diameter in the small aperture state with a small blade warp amount and a small sliding load. Forming each aperture-side portion ($1a$ to $7a$) such that their width W in the blade rotation direction is wider than the minimum stop aperture diameter results in a more sufficient sliding performance in the closing down of the stop aperture to the minimum stop aperture diameter.

Moreover, in the aperture stop apparatus of this embodiment, since the inner edge ($1e$ to $7e$) of each aperture-side portion ($1a$ to $7a$) is thin, the thickness of each stop blade (1 to 7) cannot be the large level difference with respect to the aperture plane of the stop aperture. This enables preventing the optical performance from being degraded due to the large level difference.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-185747, filed on Aug. 24, 2012 which is hereby incorporated by reference herein in its entirety.

What is claimed is:

1. A light-quantity control apparatus comprising:
multiple light-quantity control blades each configured to overlap with at least another one of the light-quantity control blades so as to form a light-passing aperture and each configured to rotate to change a size of the light-passing aperture,
wherein each of the multiple light-quantity control blades includes a thick portion and a thin portion,
wherein the thick portion forms an outer end portion on an opposite side to the light-passing aperture in a rotation direction of the light-quantity control blade,
wherein the thin portion is formed in an aperture side blade area that overlaps with the at least another one of the multiple light-quantity control blades so as to form part of a circular overlap of the multiple light-quantity control blades and that includes an inner edge forming an edge of the light-passing aperture,
wherein the thin portion has a thickness decreasing in the rotation direction from the thick portion toward the inner edge,
wherein the thin portion is formed in part of each of the multiple light-quantity control blades, and
wherein only the thinnest portion of the thin portion of each of the multiple light-quantity control blades forms the edge of the light-passing aperture when the light-passing aperture has the minimum stop aperture diameter.

2. A light-quantity control apparatus according to claim 1, wherein an angle formed by both surfaces of the thin portion in its thickness direction or an angle formed by tangent lines of the both surface is 30 degrees or less.

3. A light-quantity control apparatus according to claim 1, wherein a width of the thin portion in the rotation direction is 3 times or more and 30 times or less of a maximum thickness of the thin portion.

4. A light-quantity control apparatus according to claim 1, wherein a width of the thin portion in the rotation direction is wider than a diameter of the light-passing aperture corresponding to a minimum stop aperture.

5. A light-quantity control apparatus according to claim 1, wherein a chamfer portion is formed at a marginal edge of each of the multiple light-quantity control blades, and
wherein the thin portion is formed independently of the chamfer portion.

6. A light-quantity control apparatus according to claim 1, wherein each of the multiple light-quantity control blades contains, in the aperture side blade area, carbon black having a hollow-shell-shaped structure.

7. A light-quantity control apparatus according to claim 1, wherein the thin portion has a shape to reduce a load or a reaction force each generated by the overlap of the multiple light-quantity control blades.

8. A light-quantity control apparatus according to claim 1, wherein the thin portion is formed such that the thickness of the thin portion decreases up to the edge portion.

9. A light-quantity control apparatus according to claim 5, wherein, of the marginal edge of each of the light-quantity control blades, an end portion located more inside than an edge of the light-passing aperture whose size is maximum is provided with the thin portion or the chamfer portion.

10. A light-quantity control apparatus according to claim 1, wherein the thin portion is formed such that the thickness of the thin portion continuously decreases toward the inner edge.

11. An optical apparatus comprising:
a body of the apparatus; and
a light-quantity control apparatus according to claim 1.

12. A light-quantity control apparatus according to claim 1, wherein in a process where a size of the light-passing aperture changes from the maximum stop aperture to the minimum stop aperture, a warp of a tip of each of the multiple light-quantity control blades is guided by the thin parts of the multiple light-quantity control blades adjacent to one another, with the thin parts of the multiple light-quantity control blades adjacent to one another being contacted with one another.

13. An optical apparatus comprising:
a light-quantity control apparatus according to claim 12.

* * * * *